F. Degen.

Curling Hat Brims.

№ 77 Reissued Dec. 31, 1845.

UNITED STATES PATENT OFFICE.

FRANCIS DEGEN, OF NEW YORK, N. Y.

IMPROVEMENT IN THE METHOD OF SETTING OR IRONING HAT-BRIMS.

Specification forming part of Letters Patent No. 2,765, dated August 31, 1842; Reissue No. 77, December 31, 1845.

*To all whom it may concern:*

Be it known that I, FRANCIS DEGEN, of the city, county, and State of New York, have invented a new and useful Improvement in the Method of Setting the Brims of Hats; and I do hereby declare that the following is a full, clear, and exact description thereof, reference being had to the accompanying drawings, making a part of this specification, in which—

Figure 1:
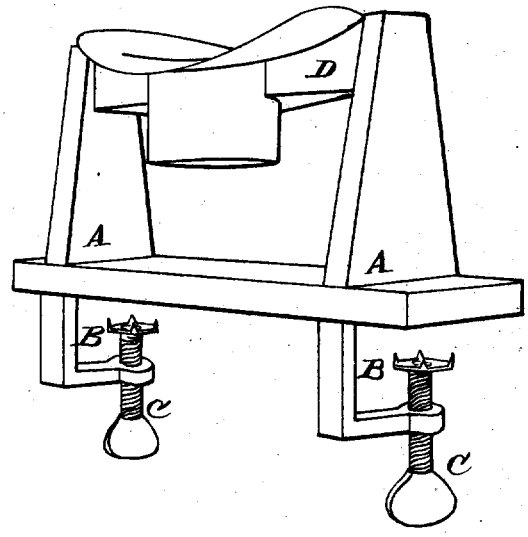
Figure 3:
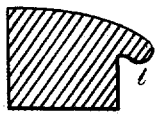
Figure 2:
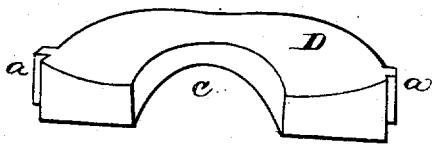

Figure 1 is a perspective view; Fig. 2, the "former;" Fig. 3, a section of the former.

The method heretofore practiced of setting the brims of hats is to iron the brim flat on the bench, which has a semicircular space cut out to receive half the crown of the hat, so that about half of the brim in turn shall rest on the bench that forms the bed in which to iron, and after this is done the brim is laid on the bench with the crown up, and a cord is laid on a little within the edge of the crown, which is bent over by the workman with one hand while he passes the iron over it with the other, to give the set to the curved edge of the brim. This is a tedious, slow, and troublesome operation; and the object of my invention is to simplify and facilitate this operation by making a former of the shape of the brim, with a curved edge, and elevating or detracting its surface sufficiently from the bench or any other stand to enable the workman to work and apply the iron to turn the edge of the brim on the former, instead of doing this by a secondary operation which must necessarily be less perfect. The frame *a* is formed of a bottom piece into which two uprights posts are set. To the under side of this bottom piece clamps B may be affixed to attach it to the bench, or it may be fastened in any other suitable manner. C are the screws of the clamp above named. On the upper ends of the posts dovetailed grooves are cut to admit the tenons *a* (see Fig. 2) on the former D. The upper side of this piece, which is constructed of metal or wood, is made of any desired shape representing the mold of one-half of the brim of a hat when in proper shape, a bead, *b*, Fig. 3, being left around projecting over the outer edge of the part below to curl the hat-brim over. This former is elevated above the finishing-bench by the frame above named, to enable the finisher to use his iron in turning the edge of the brim without moving the hat. A semicircular concavity, *c*, is made in the edge of the former to embrace the hat-crown, as shown in Fig. 1.

The machine is attached to the finishing-bench by the clamps or screws and receives the hat with its crown downward. The brim is then moistened with a brush or sponge, and a warm finishing-iron is passed over it. After the brim is softened and shaped in this way it is held tight to the machine by the hand till it is cool, and the brim is then smoothed off by the iron. To finish the other half, the hat is turned and treated in the same way.

This machine can be made with a double former or one extending around the hat; but I prefer it only on one side, as above described. By this mode of setting hats they are much more true and firm and equal in form, and in setting plush or silk hats by this process the upper side of the brim will never peel or blister, as is often the case when set by hand.

Having thus fully described my improvement, what I claim as my invention, and desire to secure by Letters Patent, is—

Elevating the former (properly shaped to give the desired form to the brim of the hat) from the bench or stand on which it rests, to enable the workman to apply the iron to and turn the edge of the brim, substantially as herein described.

FRANCIS DEGEN.

Witnesses:

J. J. GREENOUGH,

A. P. BROWNE.